United States Patent
Steudel

(10) Patent No.: US 7,046,190 B2
(45) Date of Patent: May 16, 2006

(54) PROCESS FOR PHASE-DERIVED RANGE MEASUREMENTS

(75) Inventor: Fritz Steudel, Sudbury, MA (US)

(73) Assignee: Raytheon Company, Waltham, MA (US)

(*) Notice: Subject to any disclaimer, the term of this patent is extended or adjusted under 35 U.S.C. 154(b) by 114 days.

(21) Appl. No.: 10/627,436

(22) Filed: Jul. 25, 2003

(65) Prior Publication Data

US 2005/0030222 A1 Feb. 10, 2005

(51) Int. Cl.
*G01S 13/72* (2006.01)
(52) U.S. Cl. .......................... 342/127; 342/95; 342/97; 342/107; 342/133; 342/139; 342/140; 342/146; 342/192; 342/194; 342/196
(58) Field of Classification Search .................. 342/95, 342/194, 97, 107, 133, 139, 140, 146, 192, 342/196, 127
See application file for complete search history.

(56) References Cited

U.S. PATENT DOCUMENTS

| | | |
|---|---|---|
| 3,828,349 A | 8/1974 | Laurenceau |
| 3,939,474 A | 2/1976 | Coleman et al. |
| 4,163,974 A | 8/1979 | Profera |
| 4,347,513 A | 8/1982 | Schindler |
| 4,649,389 A | 3/1987 | Taylor et al. |
| 4,649,390 A | 3/1987 | Andrews et al. |
| 4,720,711 A | 1/1988 | Quesinberry et al. |
| 4,720,712 A | 1/1988 | Brookner et al. |
| 4,743,907 A | 5/1988 | Gellekink |
| 4,766,437 A | 8/1988 | Schmidt et al. |
| 4,914,441 A | 4/1990 | Brookner |
| 5,014,061 A | 5/1991 | Ghose |
| 5,173,706 A | 12/1992 | Urkowitz |
| 5,302,955 A | 4/1994 | Schutte et al. |
| 5,442,359 A | 8/1995 | Rubin |
| 5,448,243 A | 9/1995 | Bethke et al. |
| 5,557,282 A | 9/1996 | Mertens |
| 5,592,178 A | 1/1997 | Chang et al. |
| 5,771,014 A | 6/1998 | Shinonaga et al. |
| 5,917,442 A | 6/1999 | Manoogian |
| 6,078,289 A | 6/2000 | Manoogian et al. |
| 6,104,343 A | 8/2000 | Brookner et al. |
| 6,122,040 A | 9/2000 | Arita et al. |
| 6,169,518 B1 | 1/2001 | Nelson et al. |
| 6,218,979 B1 | 4/2001 | Barnes et al. |
| 6,232,920 B1 | 5/2001 | Brookner et al. |

(Continued)

FOREIGN PATENT DOCUMENTS

DE 44 07 369 A1 9/1995

(Continued)

OTHER PUBLICATIONS

Baker, C.J., et al., "Netted Radar Sensing" A.L.; Aerospace and Electronic Systems Magazine, IEEE, vol. 18, Issue 2. Feb. 2003, pp. 3-6.

(Continued)

*Primary Examiner*—Daniel Pihulic
(74) *Attorney, Agent, or Firm*—Daly,Crowley,Mofford & Durkee,LLP

(57) ABSTRACT

A method and apparatus for determining range of a radar target is provided. Signal samples based on returns of a target during tracking are processed to produce a wideband envelope range estimate for components of target motion. The components of target motion include precession and spin motion. Ambiguous phase values are measured. An unambiguous phase value indicative of range is produced from the wideband envelope range estimate and measured ambiguous phase values.

12 Claims, 15 Drawing Sheets

U.S. PATENT DOCUMENTS

| | | | |
|---|---|---|---|
| 6,362,774 | B1 | 3/2002 | Green |
| 6,538,597 | B1 | 3/2003 | Steudel |
| 6,630,902 | B1 | 10/2003 | Fenton et al. |
| 6,677,887 | B1 * | 1/2004 | Harman ............... 342/107 |
| 2002/0060639 | A1 | 5/2002 | Harman |
| 2003/0078730 | A1 | 4/2003 | Sekiguchi |
| 2003/0088361 | A1 | 5/2003 | Sekiguchi |
| 2003/0097237 | A1 | 5/2003 | Sekiguchi |
| 2004/0054473 | A1 | 3/2004 | Shimomura |
| 2004/0080449 | A1 | 4/2004 | Horibe |
| 2005/0030222 | A1 * | 2/2005 | Steudel ............... 342/107 |

FOREIGN PATENT DOCUMENTS

| | | |
|---|---|---|
| EP | 0 509 843 A2 | 10/1992 |
| EP | 0 509 843 A3 | 10/1992 |
| EP | 0 851 238 A2 | 1/1998 |
| EP | 0 851 238 A3 | 1/1998 |

OTHER PUBLICATIONS

Sedyshev, Yu N. et al., "Focusing of the Spatially Separated Adaptive Antenna Arrays on Multiple Radiation Sources by Method of Correlation Identification of the Bearings", Ant. Theory and Techs., 2003, IVth Int'l Conf. on. vol. 1, Sep. 9-12, 2003, pp. 42-46.

PCT International Search Report, PCT/US2004/019056, Oct. 13, 2004.

Brookner, "Efficient Technique for Estimating Elevation Angle When Using a Broad Beam for Search in a Radar;" U.S. Appl. No. 10/683,507; filed Oct. 10, 2003.

Brookner; "Multiple Radar Combining for Increased Range, Radar Sensitivity and Angle Accuracy;" U.S. Appl. No. 10/684,081; filed Oct. 10, 2003.

PCT Search Report; PCT/US2004/032247; dated Feb. 22, 2005.

PCT Search Report; PCT/US/2004/032065; dated Feb. 2, 2005.

* cited by examiner

PROCESS FOR PHASE-DERIVED RANGE MEASUREMENTS

BACKGROUND

The invention relates generally to radar systems, and more particularly, to radar range measurement.

Typically, a radar system (or more simply a radar) tracks a target's centroid position to obtain an estimate of ballistic flight characteristics for range determination. To obtain estimates of ballistic flight, radar systems typically use filters such as Kalman filters of relatively high order to produce range measurement data. Such filtering is designed to model only a target's ballistic trajectory. Therefore, it is possible to track and measure range from target trajectory quite accurately.

To observe small variations in range due to motions other than ballistic motion, it is necessary to sample target returns in a manner that ensures that phase change measured from one radar pulse to the next is unambiguous. Such unambiguous phase measurements require a significant amount of radar system resources, more specifically, higher signal-to-noise (SNR) and data rates, thus reducing the safety margin built into the radar to cope with interferers such as main beam jamming or an increased number of targets.

SUMMARY

The present invention features a technique that provides a high precision range measurement at reduced signal-to-noise ratio (SNR) and data rate so that radar system objectives in a main beam jamming and/or multiple target environment can be achieved.

In one aspect, therefore, determining range of a radar target includes receiving signal samples based on returns of a target during tracking, processing the signal samples to produce a wideband envelope range estimate for components of target motion comprising precession and spin components, measuring the signal samples to produce ambiguous phase values and using each wideband envelope range estimate and ambiguous phase value to produce an unambiguous phase value indicative of range.

Embodiments of the invention may include one or more of the following features.

The range determination can further include determining an estimate of ballistic trajectory of a target for the signal samples and removing the estimated ballistic trajectory during processing.

The processing of the signal samples can operate at a sampling rate that is at least twice the frequency of the target spin motion components.

Using each wideband envelope range estimate and ambiguous phase value to produce the unambiguous phase value can include subtracting the measured ambiguous phase from the wideband envelope range estimate to produce an error value associated with the wideband envelope range estimate and subtracting the error value from the wideband envelope range estimate to give the unambiguous phase value.

The magnitude of the error value can be determined and resources of a radar system that performs the tracking can be adjusted to ensure that the magnitude of the error is sufficiently low.

The signal sample processing can include: i) producing a spectrum of wideband envelope range estimates from the signal samples; ii) transforming the wideband envelope range estimates to obtain a spectral estimate of each motion component of precession, spin, spin plus precession and spin minus precession; iii) detecting each motion component; iv) estimating amplitude, frequency and phase for each motion component spectral estimate; and v) forming a sinusoid in range motion from the estimate of amplitude, frequency and phase for each motion component spectral estimate.

The processing can occur in batch mode for signal samples obtained during several cycles of precession motion.

The sinusoid in range motion can be used to determine an integer number k of cycles in phase change between pulses of the signal samples. A value of $2\pi k$ can be added to the measured ambiguous phase value prior to subtracting the measured ambiguous phase value from the wideband envelope range estimate.

In another aspect, a system includes a transmitter/receiver to direct transmit signals to and receive return signals from a target, a processor to process the return signals as in-phase and quadrature samples to produce angle information and range signals, a tracker to track a target detected according to results of the processing by the first processor, the tracker measuring range data during tracking and estimating a ballistic trajectory therefrom, and a unit operable to use a wideband envelope range estimate of the in-phase and quadrature samples, the ballistic trajectory estimate and an ambiguous phase measurement of the in-phase and quadrature samples to produce a range measurement that is unambiguous in phase.

Particular implementations of the invention may provide one or more of the following advantages. Through the use of the range phase determination of the present invention it is possible to observe small motions in body dynamics of targets, e.g. re-entry vehicles and decoys, and measure range of such targets with the precision of phase. Moreover, it is possible to reduce the data rate and signal-to-noise ratio requirements of phase-derived range measurement by using wideband envelope range (WBER).

Other features and advantages of the invention will be apparent from the following detailed description and from the claims.

BRIEF DESCRIPTION OF THE DRAWINGS

Like reference numerals will be used to represent like elements.

DETAILED DESCRIPTION

Figure 1:
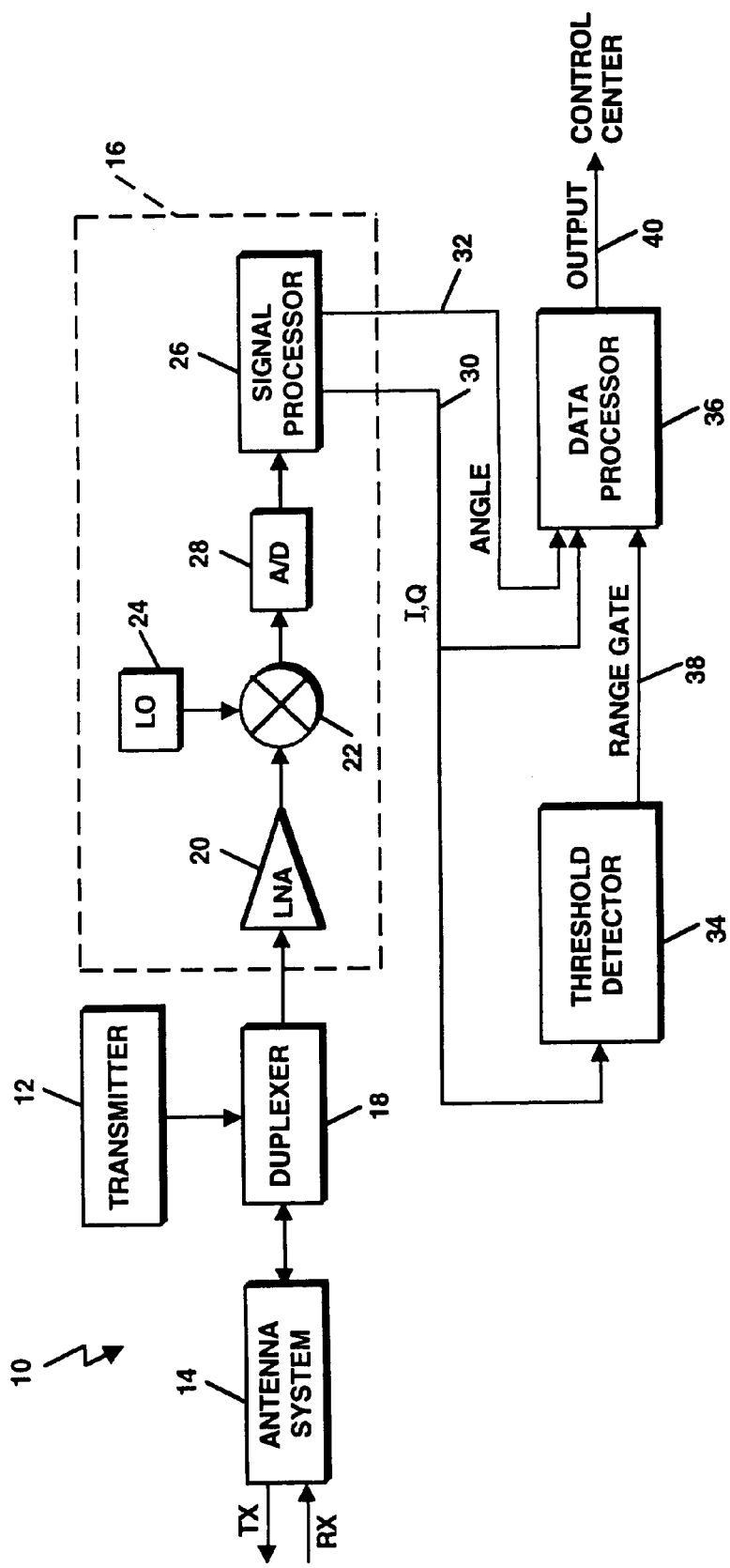
FIG. 1 is a block diagram of a tracking radar system that includes a data processor which performs phase-derived range measurements.

Referring to FIG. 1, a tracking radar system 10 is shown. The tracking radar system 10 may be a ground-based radar system, but could be employed on a ship or in an aircraft or other airborne or non-airborne vehicle as well. In one embodiment, the tracking radar system 10 is implemented as a pulse Doppler tracking radar system. The tracking radar system 10 includes a transmitter 12, the output of which is delivered to an antenna system 14 for radiation in the form of a transmit beam. The antenna system 14 collects echo (return) signals received from a target. The return signals are processed by a receiver 16 to detect the presence of the target and determine its location in range and in angle. The antenna system 14 can include a mechanically or electronically rotating antenna. A duplexer 18 coupled to the transmitter 12, receiver 16 and antenna system 14 allows the antenna system 14 to be used on a time-shared basis for both transmitting and receiving.

Still referring to FIG. 1, the receiver 16 includes a low-noise amplifier ("LNA") 20 that is coupled to a down converter 22, which performs radio frequency (RF) to intermediate frequency (IF) conversion. A receiver exciter or local oscillator ("LO") 24 provides oscillator signals to the down converter 22. The down converter 22 is connected to a signal processor 26 via an A/D unit 28. The echo signals as received by the signal processor 26 correspond to in-phase ("I") and quadrature ("Q") signals. The signal processor 26 operates on the I and Q signals (as sampled by the A/D converter 28) to produce processed I, Q samples 30 and angle information 32, e.g., elevation and/or azimuth angle information. The signal processor 26 performs filtering, possibly including pulse compression filtering, envelope detection and post-detection integration (video integration), and angle determination, among other functions.

The system 10 further includes a threshold detector 34 and a data processor 36. The threshold detector 34 receives the I, Q samples from the signal processor 26 and generates from those samples a range (gate) signal 38. It will be appreciated that the threshold detection and signal processing may be executed by a single processor or computer. The signal processor 26 and threshold detector 34 can be coupled to, and provide detection information to other conventional radar system elements, e.g., the data processor 36, as well as a display and control center, e.g., a ballistic management control center (not shown). The I, Q samples produced by the signal processor 26 and range signal (from the threshold detector 34) are provided to the data processor 36 for use in further processing, as will be described. Data processor results (output 40) may be provided to the control center, as indicated. Those aspects of the system 10 and its components not described herein can be implemented according to known techniques.

Figure 2:
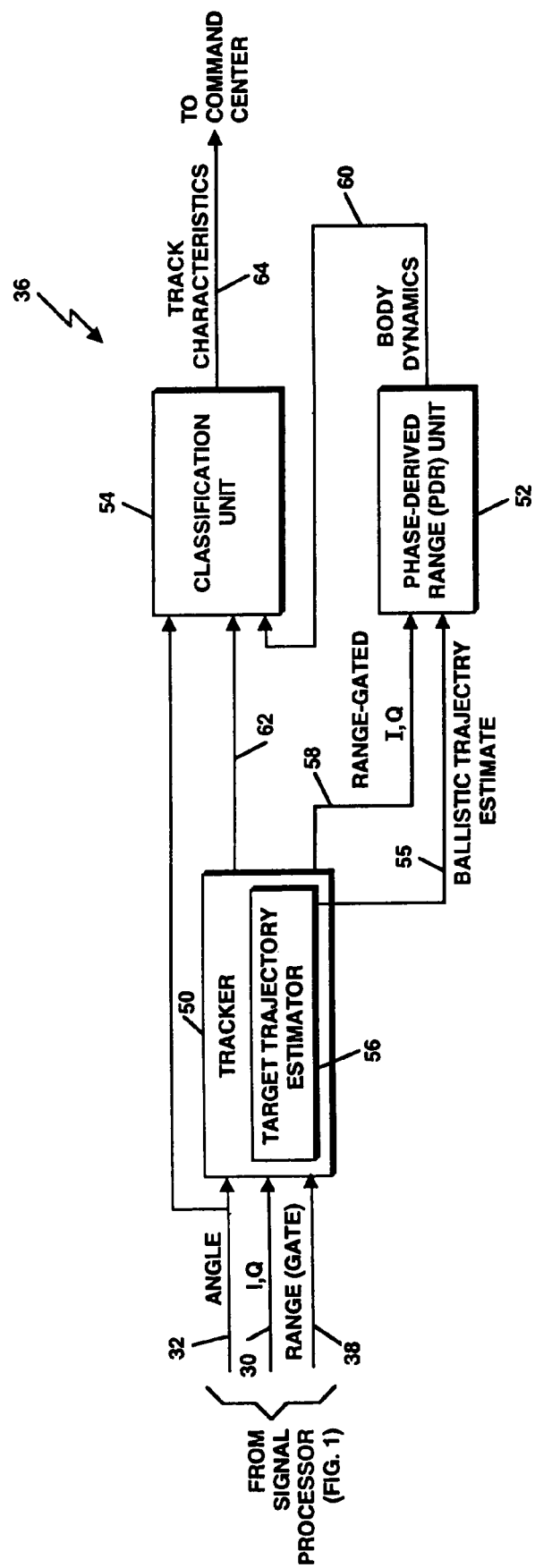
FIG. 2 is a block diagram of an exemplary data processor that employs a phase-derived range (PDR) unit to produce unambiguous phase values for phase-derived range measurements.

Referring to FIG. 2, the data processor 36 includes a tracker 50, a phase-derived range (PDR) block or unit 52 and a classification unit 54. The tracker 50 receives the gated I/Q samples 30 and angle information 32 from the signal processor 26, and receives the range gate signal 38 from the threshold detector 34. The tracker 50 initiates a track for a detected target, conducts tracking to measure range data and estimates from the range data a target trajectory 55 (using a target trajectory estimator 56). The tracker 50 provides to the PDR block 52 range gated I/Q samples 58 for the tracked target. The PDR block 52 operates on these samples to produce a precession and spin spectral analysis, as will be described later with reference to FIG. 4. The results of this spectral analysis (body dynamics 60) are provided to the classification unit 54, which uses this and other information (e.g., output 62 from the tracker 50 and angle information 32 from the signal processor 26) to provide a comprehensive set of target characteristics 64 to the control center (not shown). The characteristics can include, for example, information that indicates how a target is to be classified, for example, classification as threatening or non-threatening. The control center uses this information (and, possibly, information from other sources, such as satellites) to determine if the target classification is sufficient or if tracking should continue. The control center sends commands to the radar transmitter/receiver to indicate which of the targets are a priority, and thus types of waveforms, data rates and SNR to use.

The tracker 50 initiates a target track, conducts tracking for a predetermined time period, e.g., between 25–100 seconds, and stores range data measured on each pulse. The tracker 50 batch-processes the entire batch of range data with a relatively high-order filter that accurately predicts ballistic trajectory. More specifically, the tracker 50 applies the high-order filter to the range data, in batch mode, to estimate a ballistic trajectory of the target. The target ballistic trajectory estimate is removed (during subsequent PDR block processing) to leave only the target precession and spin motion components, the phase of which can be estimated with sufficient precision, as will be described below with reference to FIG. 4.

Figure 3:
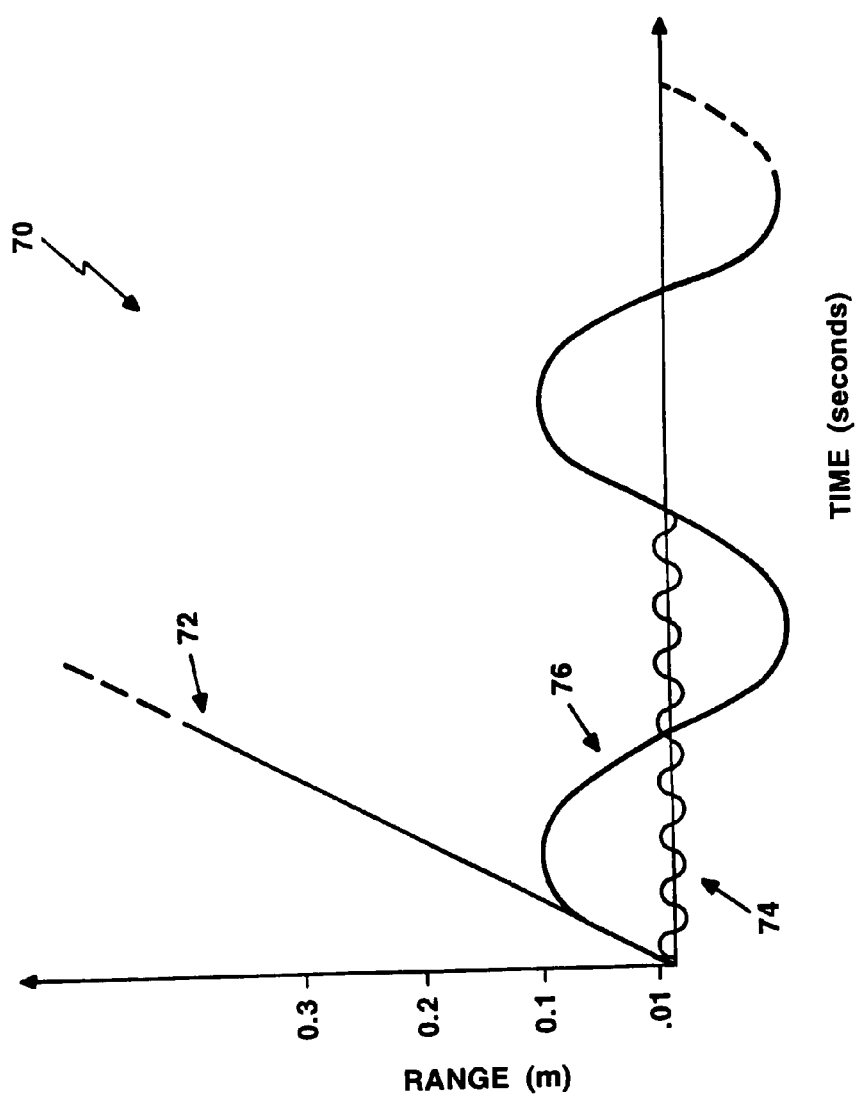
FIG. 3 is a plot of range vs. time for an exemplary ballistic trajectory of a target as well as the associated precession and spin components of target motion.

FIG. 3 illustrates, in a plot of range versus time 70, the various components of target motion. These motion components include target ballistic path or trajectory 72, spin 74 and precession 76. The spin and precession motions follow a sine wave type of pattern, as shown in the figure. Precession refers to wobbling (or lateral displacement) motion imparted to a spinning target during flight. For the example illustrated, the target motion has a precession motion with a frequency of ⅛ Hz and peak amplitude of 0.1 m. The spin motion for the illustrated example has a spin motion frequency of 1 Hz and a peak amplitude of 0.01 m. The minimum Nyquist sampling at which the precession motion can be sampled (assuming the ballistic trajectory component has been removed) is twice the precession frequency. However, it is the spin frequency that determines how often the precession motion must be sampled. Thus, the minimum sampling frequency is twice the spin motion frequency, or 2 Hz for the illustrated example.

Figure 4:
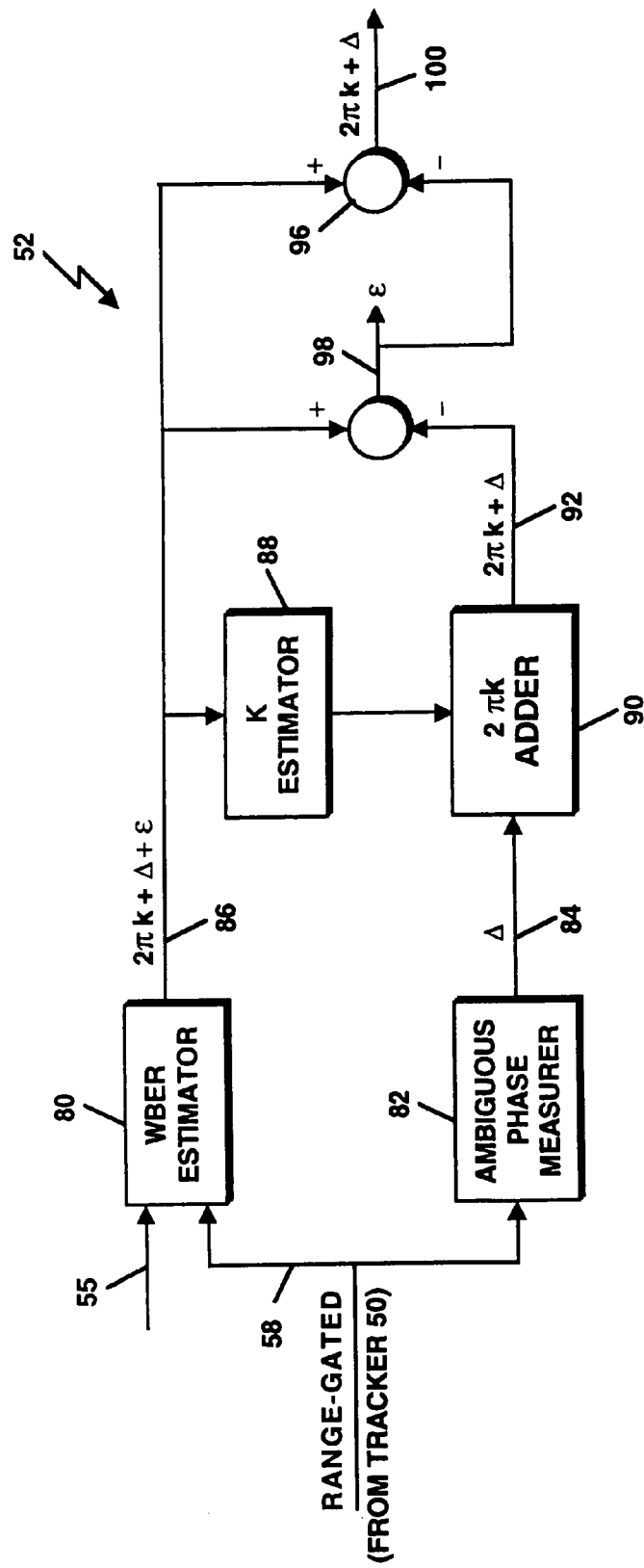
FIG. 4 is a block diagram of a PDR unit.

Referring to FIG. 4, the PDR block 52 receives from the tracker 50 the gated I, Q samples 58 and the ballistic trajectory estimate 55. The PDR block includes a Wideband Envelope Range (WBER) estimator 80 and a unit 82 for measuring or obtaining measurements of phase "$\Delta$" 84 of the I, Q samples. Both of these units receive and operate on the I, Q samples 58. The measured phase 84 is precise but ambiguous in that the number of cycles is unknown. The WBER estimator 80 produces from the samples a WBER phase estimate 86 in the form "$2\pi k + \Delta + \epsilon$", where "k" is the integer number of cycles in phase change from one pulse to the next, and "$\epsilon$" is the WBER estimate error value. The error needs to be less than $\pm\pi$ radians for k to be an integer number. The unit 52 further includes a "k" estimator 88, and a "$2\pi k$" adder 90 to convert the k cycles to radians and add the "$2\pi k$" radians to the ambiguous phase $\Delta$ to form a phase value 92 of "2πk+Δ". The PDR unit 52 includes two subtractors, a first subtractor 94 and a second subtractor 96. The first subtractor 94 subtracts the phase value 92 from the WBER phase estimate 86 to produce an error value 98 indicative of the error ε. The second subtractor 96 subtracts the error value 98 (that is, "ε") from the WBER phase estimate 86 to produce an unambiguous phase value 100 indicative of range. The resulting output 2πk+Δ, which gives the range with the precision of phase, is unambiguous as long as the value of the WBER error ε is less than 1 radian root-mean-squared (RMS). It will be understood that one or more of the elements represented in the block diagram may be implemented in software.

The SNR and length of dwell time are adjusted so that the error (in residue) pulse-to-pulse is small compared to ±π radians (or 1σ, approximately 1 radian). A goal of 1σ error of 1 radian is selected so that ±3σ=±3 radians (~π radians) ensures that range, with the precision of phase, can be measured unambiguously.

The approach and assumptions for the spectral analysis of the PDR unit 52 are as follows. The pulse repetition frequency (PRF) that is used is just above the Nyquist sampling rate, that is, e.g., equal to or greater than twice the spin frequency. The processing of the PDR unit 52 can be achieved by batch processing, rather than with a real-time phase-locked loop, so that the required data rate is determined by Nyquist sampling as opposed to phase-locked loop requirements.

A high order filter in the WBER estimator 80 batch-processes several cycles of precession motion. The output of the filter contains a smooth estimate of range. Wideband pulses are used to estimate envelope range. A spectrum of wideband envelope range estimates produce estimates of precession, spin and spin±precession motion for long dwells and high SNR. In the analysis, it is assumed that WBER estimates give the range to a target's center of gravity. That is, the smoothed range of the filter is varying slowly, so that pulse-to-pulse differences between range measured and estimated by the filter is small.

Figure 5:
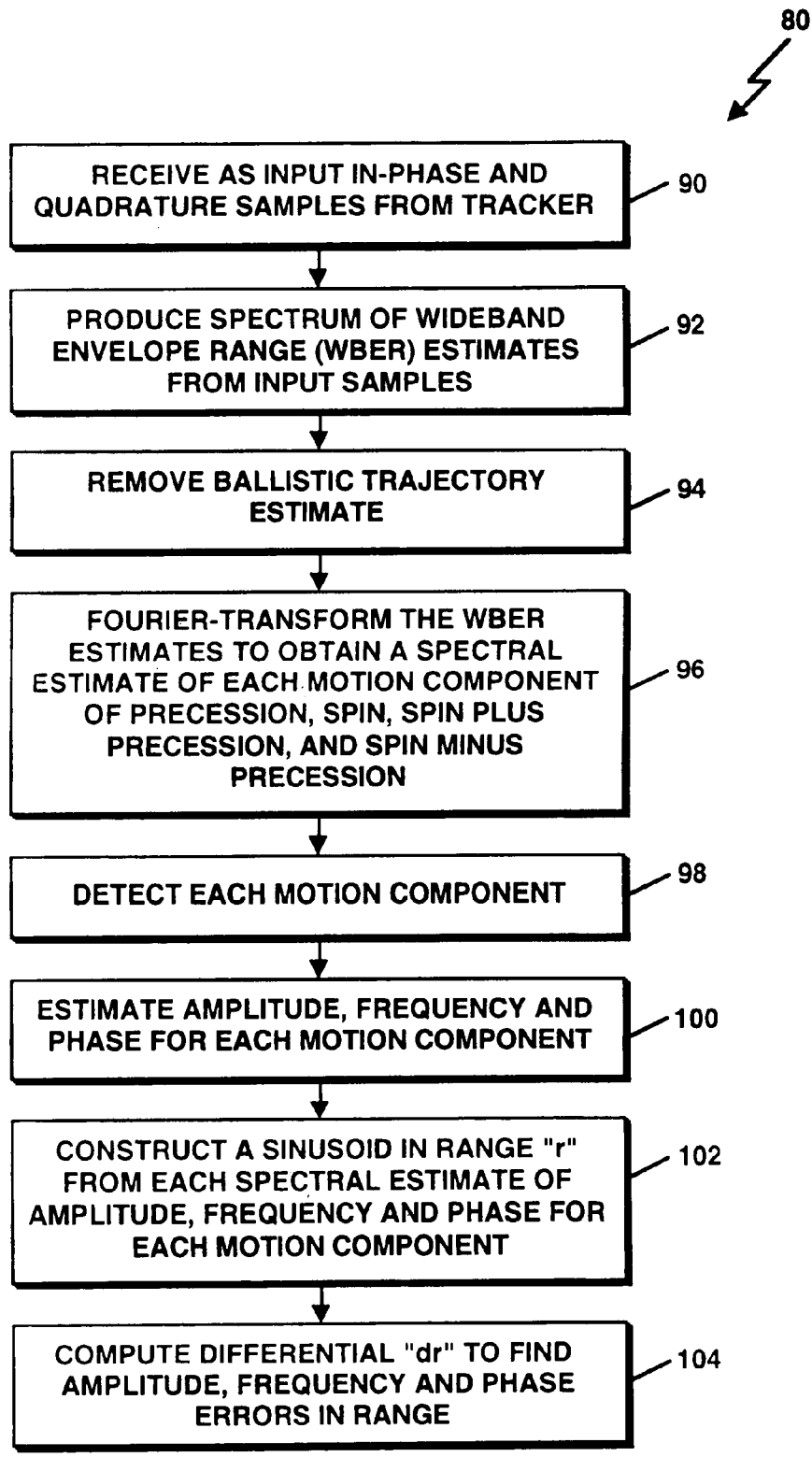
FIG. 5 is a flow diagram illustrating the operation of a Wideband Envelope Range (WBER) estimator of a PDR unit.

Referring to FIG. 5, the WBER estimator 80 operates as follows. The WBER estimator 80 receives as input the I, Q samples (step 90). The WBER estimator 80 produces a spectrum of WBER estimates from the input samples (step 92). The WBER estimator 80 removes the ballistic trajectory estimated by the tracker (step 94). The WBER estimator 80 Fourier-transforms the WBER estimates to obtain a spectral estimate of each motion component of precession, spin and spin±precession (step 96). The resolved precession and spin components are detected (if their peak excursions are greater than λ/4) (step 98), and their amplitude $a_p$, frequency f, and phase θ are measured (step 100). The WBER estimator 80 constructs a sinusoid in range r=$a_p$ sin (2πft+θ) from the spectral estimates of amplitude $a_p$, frequency f and phase θ for each motion component (step 102). The WBER estimator 80 computes the differential dr to find amplitude, frequency and phase errors in range (step 104). Referring back to FIG. 4, the integer value of "k" is determined once the frequency estimate is known.

FIGS. 6–15 illustrate results of WBER estimator processing for an example with the following numerical values:

$f_s$=1 Hz spin frequency
$f_p$=⅛ Hz precession frequency
$N_p$=3 precession cycles
PRF=3 Hz
S/N=15 dB, per-pulse SNR
λ=0.03 m, wavelength Signal bandwidth=2B
$R_p$=0.1 m, peak precession range
$R_s$=0.01 m, peak spin range
$R_{s-p}$=0.0025 m, peak spin minus precession range
$R_{s+p}$=0.007 m, peak spin plus precession range The precession and spin components have peak precession and peak spin values representative of actual targets. The spin-precession component is plotted with higher than expected value, to illustrate its position in the spectral plots. The spin plus precession component can be larger than the spin component, depending on trajectory and target motion scenarios.

Figure 6:
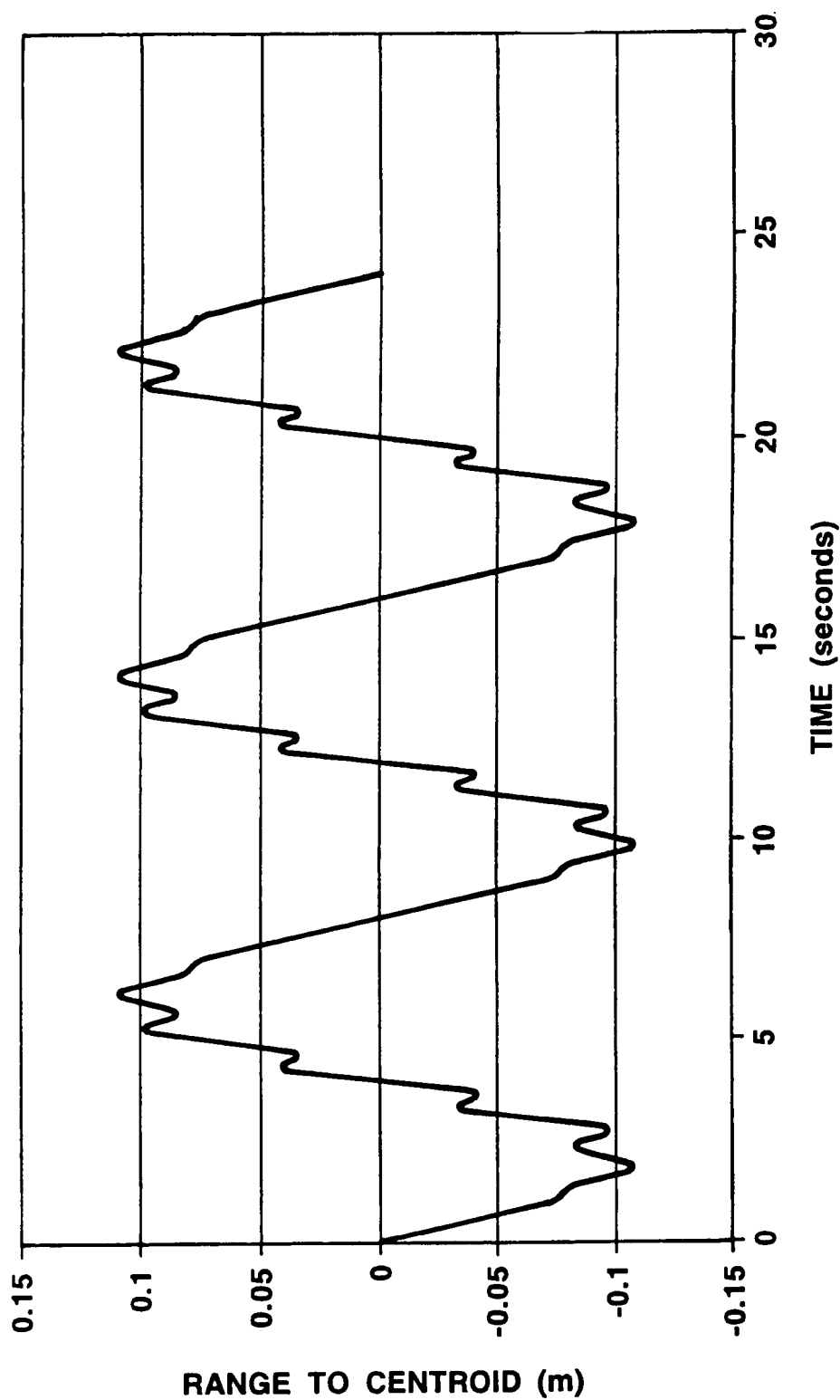
FIG. 6 is a plot of range versus time.

Referring to FIG. 6, a plot of range in the time domain for three precession cycles (24 seconds) shows that precession dominates, with the spin and other components modulating at 1−0.125=0.875 Hz, 1 Hz, 1+0.125=1.25 Hz. The data is sampled at 3 Hz, Fourier transformed and zero padded, and then inverse Fourier transformed to obtain a near continuous plot.

Figure 7:
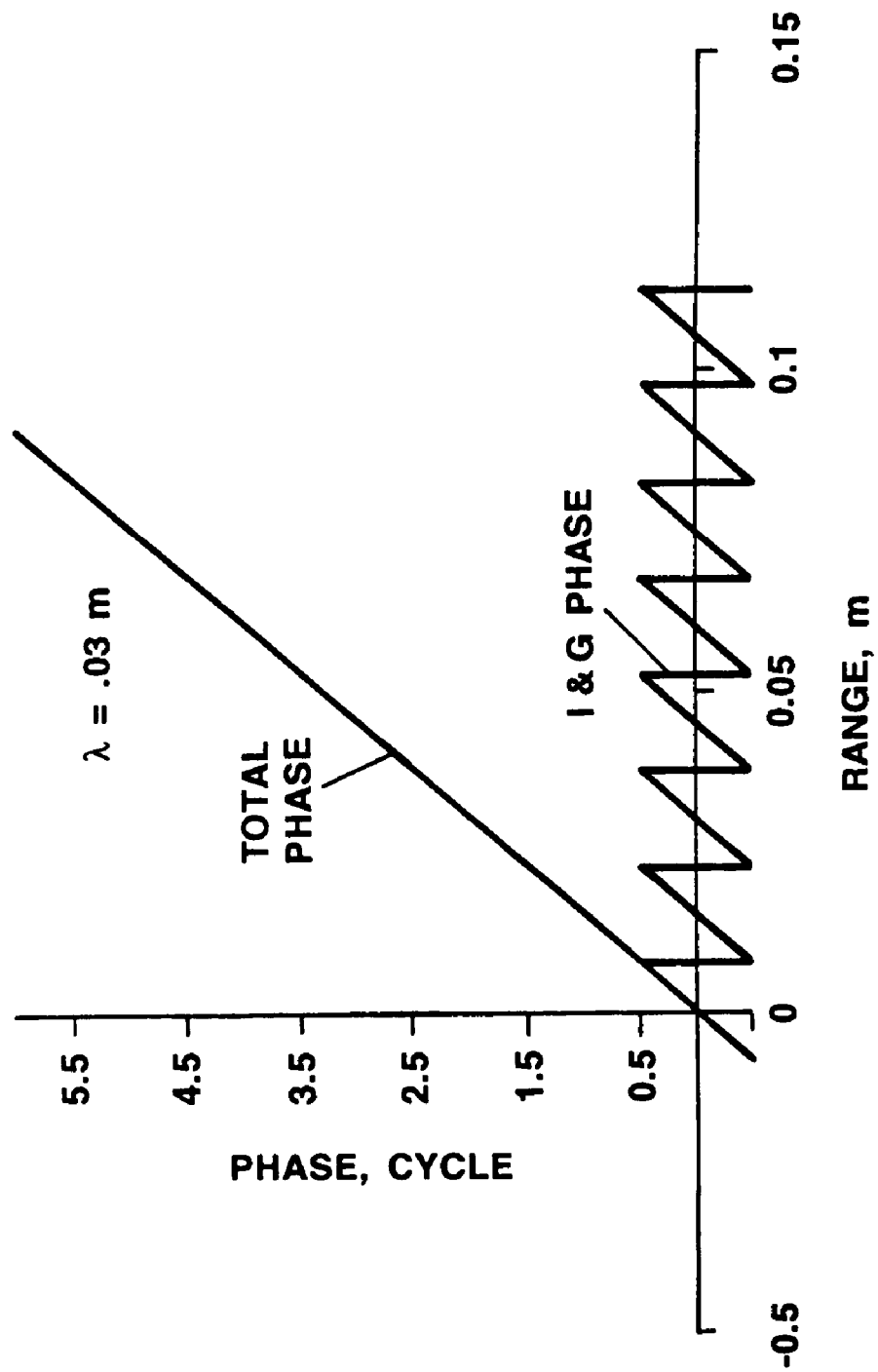
FIG. 7 is a plot of phase versus range.

Referring to FIG. 7, a plot of phase versus range is shown. This plot gives peak phase excursion in cycles for a given peak range in meters. For example, for a 0.1 meter peak the number of cycles is:

$$0.1 \text{ m} \times (4\pi \text{ radians}/\lambda \text{m}) = 41.9 \text{ radians} = 6.67 \text{ cycles}.$$

The spin component is 0.01 m peak or 4.19 radian=0.67 cycles, or just slightly more than ±0.5 cycle. Thus, the spin component in the example requires detection with sufficient spectral SNR to accurately model the amplitude, phase and frequency. As discussed earlier, components with a peak excursion of less than 0.0075 m need not be detected and modeled.

Figure 8:
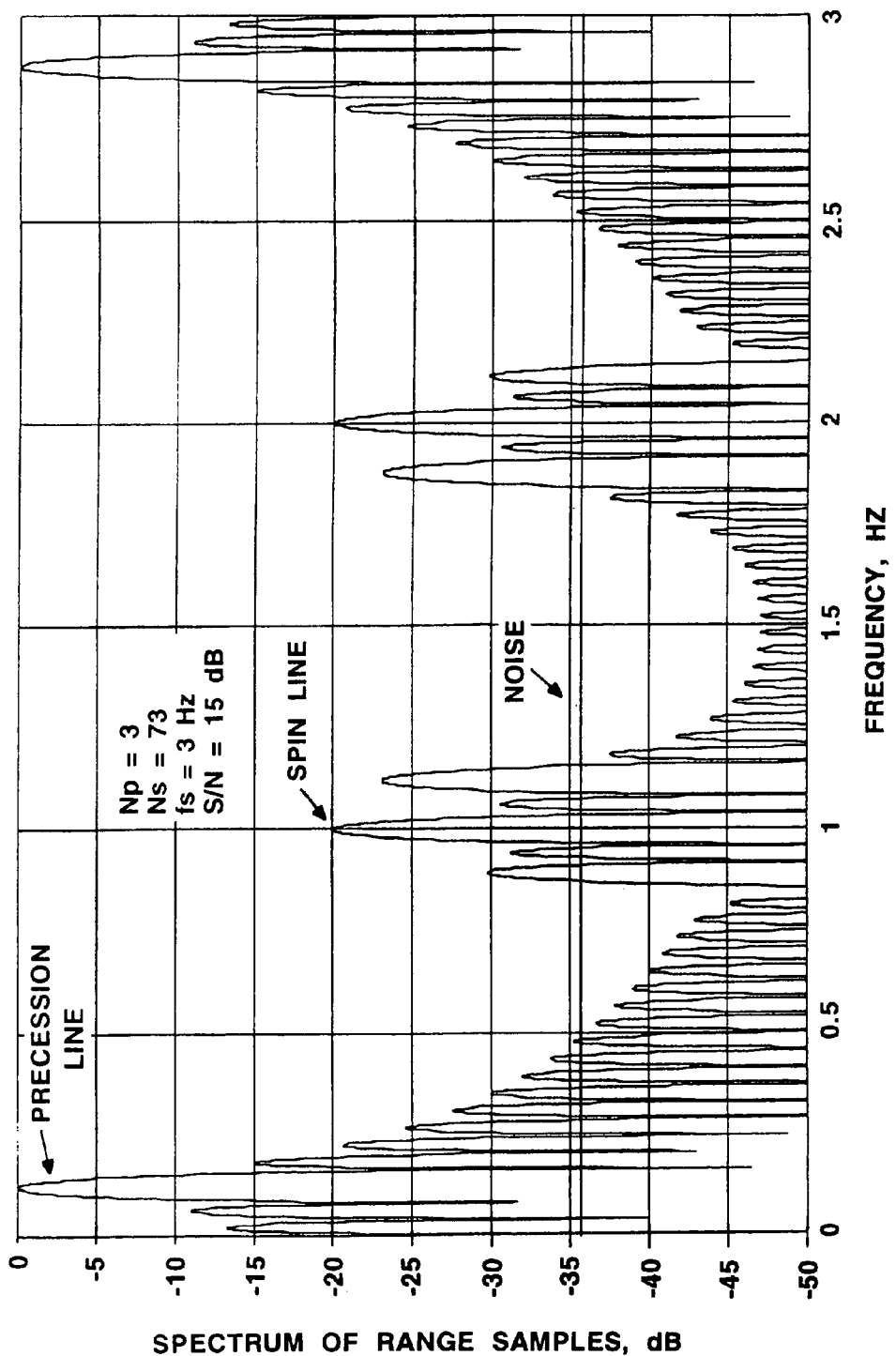
FIG. 8 is a plot of spectrum of range relative to center of gravity.

Referring to FIG. 8, a plot of the spectrum of WBER samples (relative to the target centroid position) is shown. The plot is the discrete Fourier transform (DFT) of the WBER measurements for 3 cycles of precession (8 second precession period) and a 1 Hz spin frequency.

It will be appreciated that if only spin were present, 2 Hz (twice the spin frequency) constitutes Nyquist sampling. Such a sampling frequency is twice the usual radar frequency and is the consequence of the data being purely real.

In the example, a 3 Hz sampling rate was selected to account for spin plus precession components and to provide sampling margin. A number of different techniques may be used to select sampling frequency. One option is to use a priori data. Another option would be to apply a bootstrap technique.

The minimum data dwell is determined by spacing between spectral lines. Precession lines adjacent to the spin line are separated from the spin line by 1/$T_p$=0.125 Hz, the precession frequency. The dwell should have two or three periods to provide good resolution, particularly when weighting is applied. The plot shows that light weighting should be added to avoid detection of sidelobes in the vicinity of the spin line. The RMS noise line shows noise about −36 dB relative to precession and about 13 dB below the spin line. Thus, the spin line can also be detected. The 3 Hz data rate therefore provides a spectrum in which all the useful data lies between 0 and 1.5 Hz.

The precession line for the illustrated example is sufficiently large that it can be readily detected. For the spin components, the critical requirement of SNR, data rate and dwell time is to provide a spectral line large enough so that spin can be detected, and with sufficiently low error that the data is effectively unwrapped in phase. It is not necessary to achieve a detection of the spectral line for small components. As long as the phase excursion $a_p$ is sufficiently small so $$\frac{4\pi a_p}{\lambda} \le \pi \text{ or } a_p \le \frac{\lambda}{4} = .0075 \text{ meters,}$$

or less than ±½ cycle, the output remains phase unambiguous. The peak excursion $a_p$ is in meters, and $$\frac{4\pi}{\lambda}$$

times the peak excursion results in range phase in radians.

The amplitude is estimated from the magnitude of the line. For each line, the frequency is estimated from linear odd weighting of the time data to obtain a "monopulse" estimate in the frequency domain. Phase is estimated from the ratio of quadratic to real component. Noise errors for each estimate of amplitude, frequency, and phase are uncorrelated with each other, although not independent. The differential dr gives the error $\epsilon$ in each of the three components, amplitude, frequency and phase, that is, $\epsilon_a$, $\epsilon_f$ and $\epsilon_\theta$, respectively, as described earlier.

Amplitude, frequency and phase errors in range are Gaussian, zero mean, uncorrelated and with standard deviations:

$$\sigma_{a_p} = \sin(2\pi ft + \theta) * \frac{a_p}{\sqrt{2S_f}} \qquad \text{Eq. 1}$$

$$\sigma_f = 2\pi t a_p \cos(2\pi ft + \theta) * \frac{\Delta f}{K_m \sqrt{2S_f}} \qquad \text{Eq. 2}$$

$$\sigma_\theta = a_p \cos(2\pi ft + \theta) * \frac{1}{\sqrt{2S_f}} \qquad \text{Eq. 3}$$

where $$\Delta R = \frac{1.33 \text{cycles}}{2B} \qquad \text{Eq. 4}$$

$\Delta f = 1/(N_s - 1)\tau$ $N_s$ = number of samples $S_f = N_s \left(\frac{a_p}{2}\right)^2$, spectral signal-to-noise ratio B=wideband chirp bandwidth
τ=time between samples Results using Eqs. 1–3 are consistent with the estimation of sinusoidal signals techniques as described in "Fundamentals of Statistical Signal Processing: Estimation Theory," by Steven M. Kay (University of Rhode Island, Prentice Hall, 1993).

From the expression for spectral signal-to-noise ratio $S_f$ (Eq. 4) it can be seen that $S_f$ depends on peak amplitude of the sinusoidal motion and bandwidth.

Figure 9:
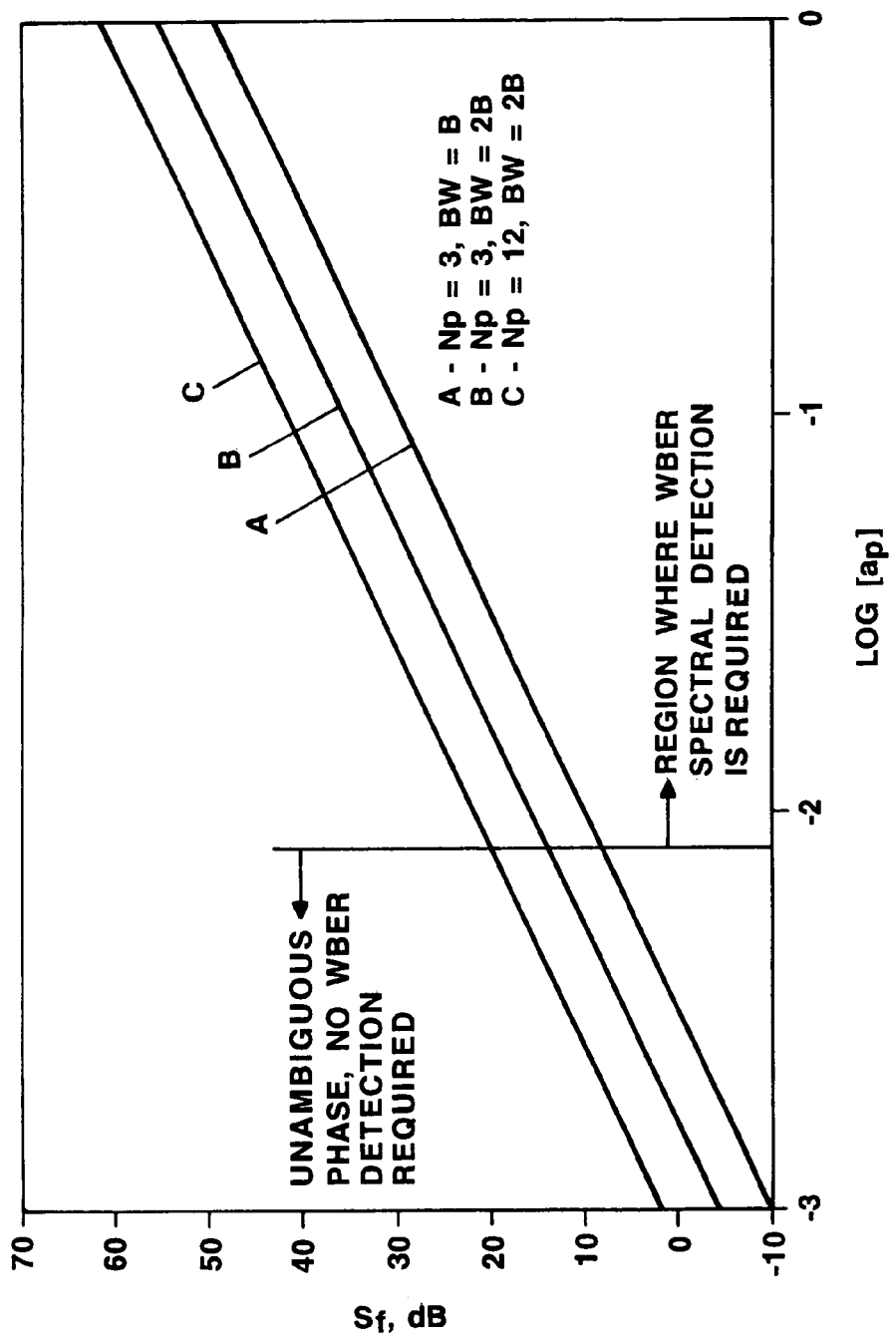
FIG. 9 shows a plot of spectral signal-to-noise requirements.

Referring to FIG. 9, which shows a plot illustrating spectral SNR ($S_f$) requirements, it is observed that, for a signal slightly less than Log ($a_p$)=−2, no spectral detection is required for this or smaller values. Thus, the requirement for SNR and signal bandwidth is to produce a spectral value of $S_f$ (slightly greater than 10 dB, depending on number of samples and allowable false alarm rate) adequate for the desired $P_d$.

Figure 10:
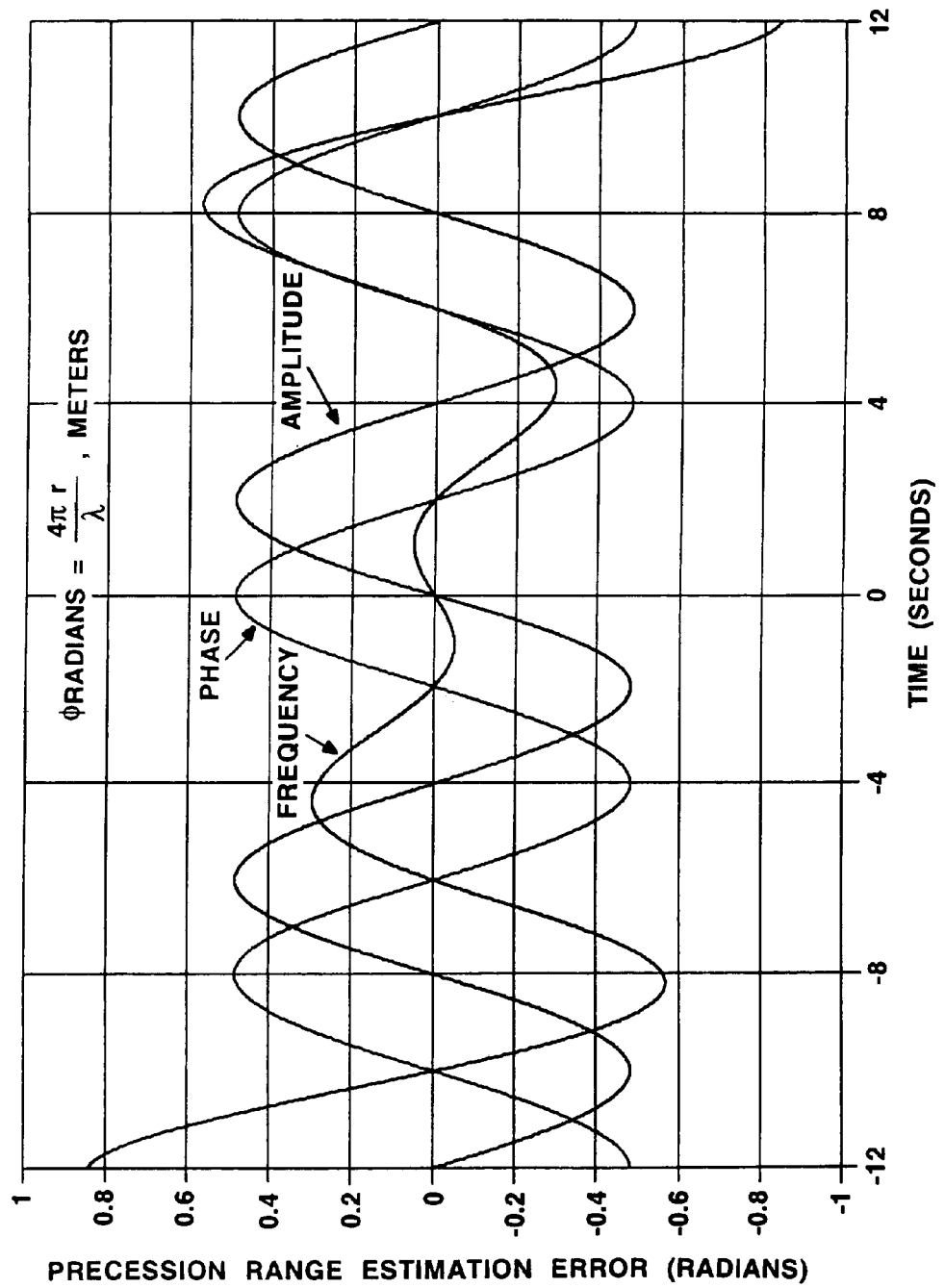
FIG. 10 is a plot of precession range estimation errors.

Referring to FIG. 10, a plot of precession WBER estimation errors as a function of time is shown. The plot gives the 1σ variation of each of the amplitude, frequency and phase errors separately. Except for the frequency error at the edge of the window, it should be noted that the errors are less than ±0.5 radian. With WBER range error less than ±0.5 radians, the number of cycles k can be estimated so that the error of ±0.5 radians is sufficient to avoid ambiguities. Thus, the RMS value of the sum of the estimation values at any specific time is less than the 1 radian goal. Weighting of the data to reduce sidelobes can further de-emphasize the edge values. Near the center of the window, frequency errors are smaller than the amplitude and phase components.

Figure 11:
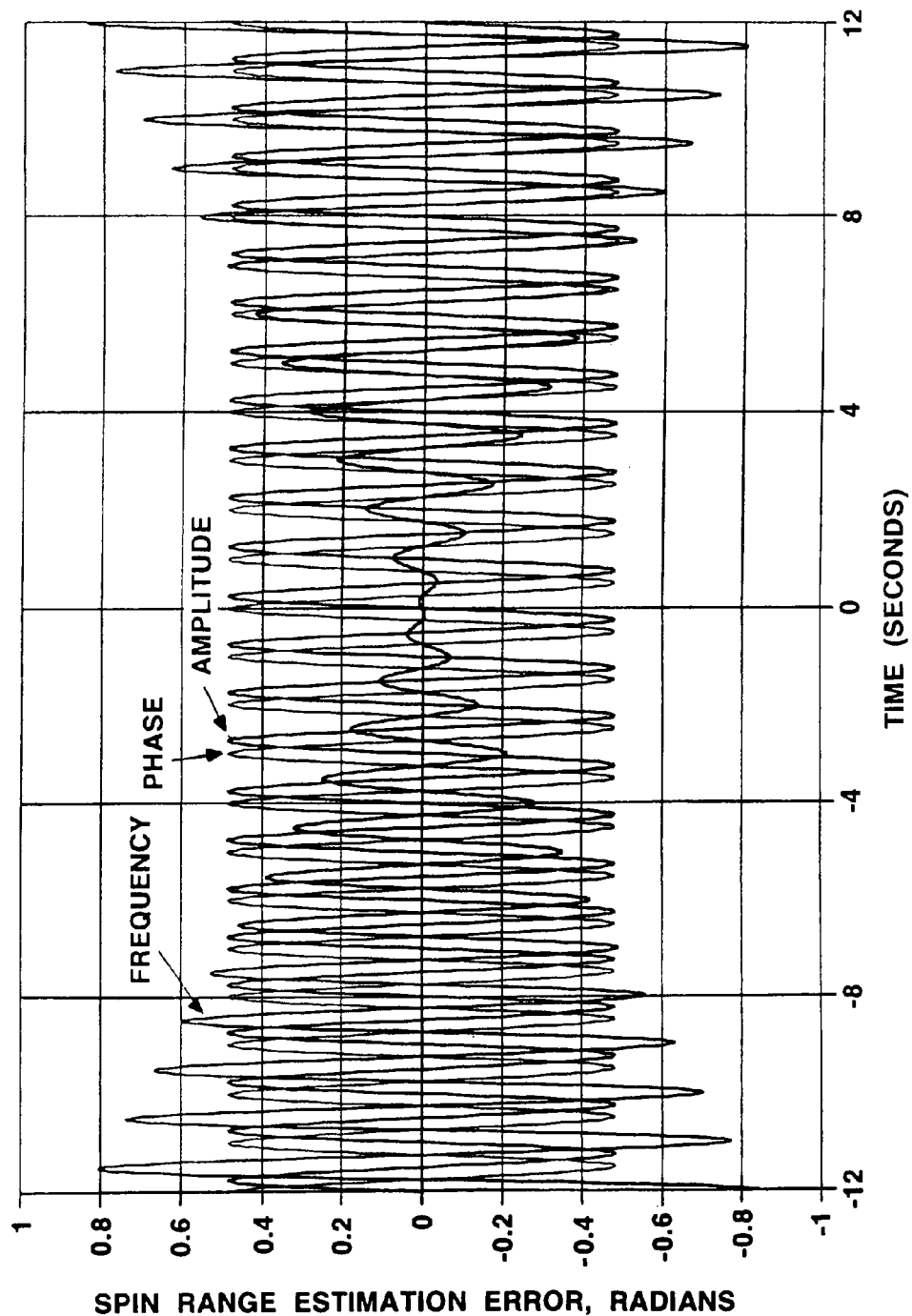
FIG. 11 is a plot of spin range estimation errors.

Referring to FIG. 11, a plot of spin range estimation error as a function of time is shown. The time reference in the plot is arbitrary. The plot shows the effect separately of amplitude, frequency, and phase errors on the reconstruction of the spin line. It can be noted that the amplitude and phase errors are the same magnitude, but shifted by 90°. This follows from $$\frac{\sigma_{a_p}}{\sin(2\pi ft + \theta)} = \frac{a_p}{\sqrt{2S_f}} = \frac{\sigma_\theta}{\cos(2\pi ft + \theta)}. \qquad \text{Eq. 5}$$

Figure 12:
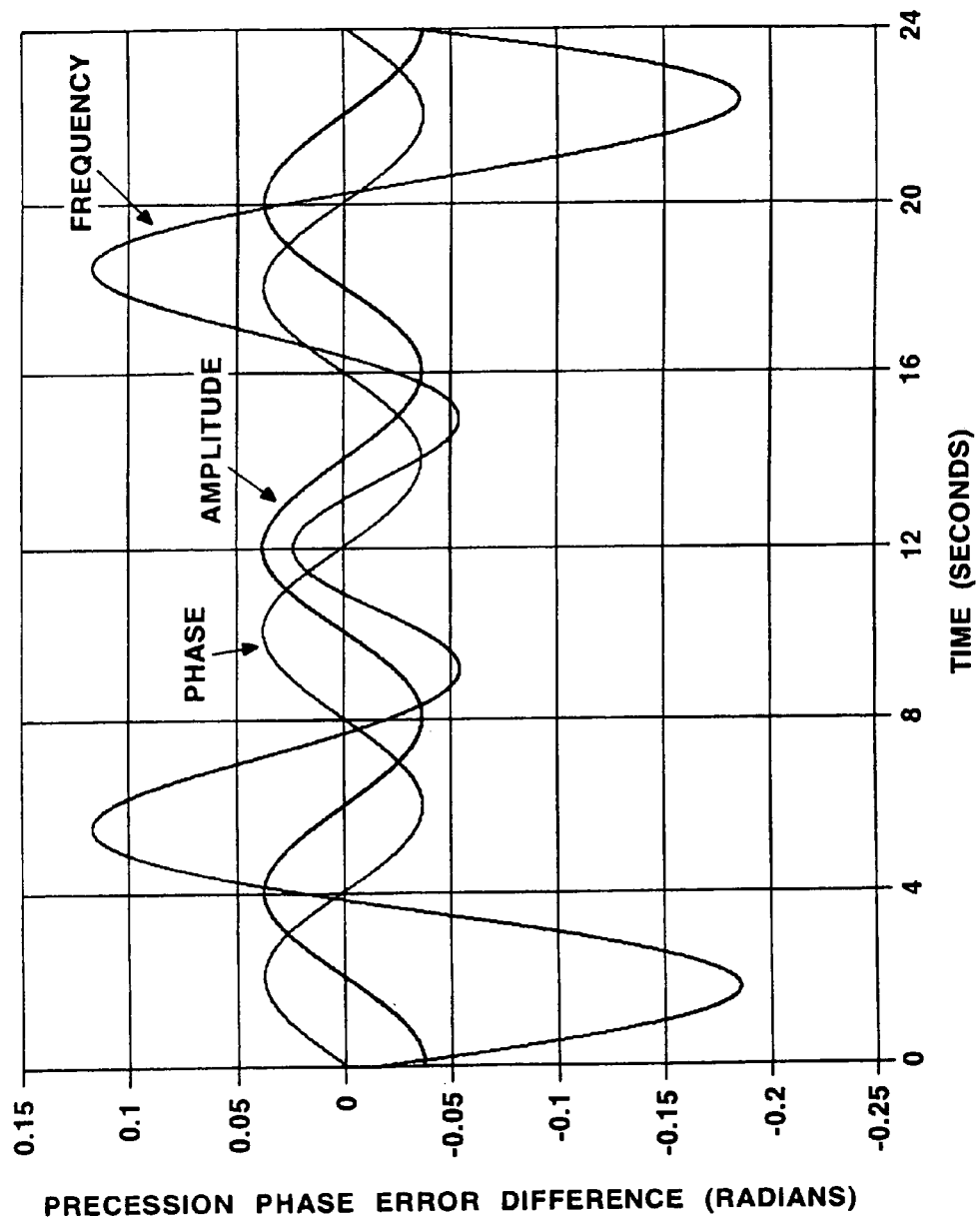
FIG. 12 is a plot of precession phase error differences.

FIG. 12 shows a plot of precession phase error differences as a function of time. The low frequency of the precession motion produces phase differences of negligible amplitude compared to ±1 radian.

Figure 13:
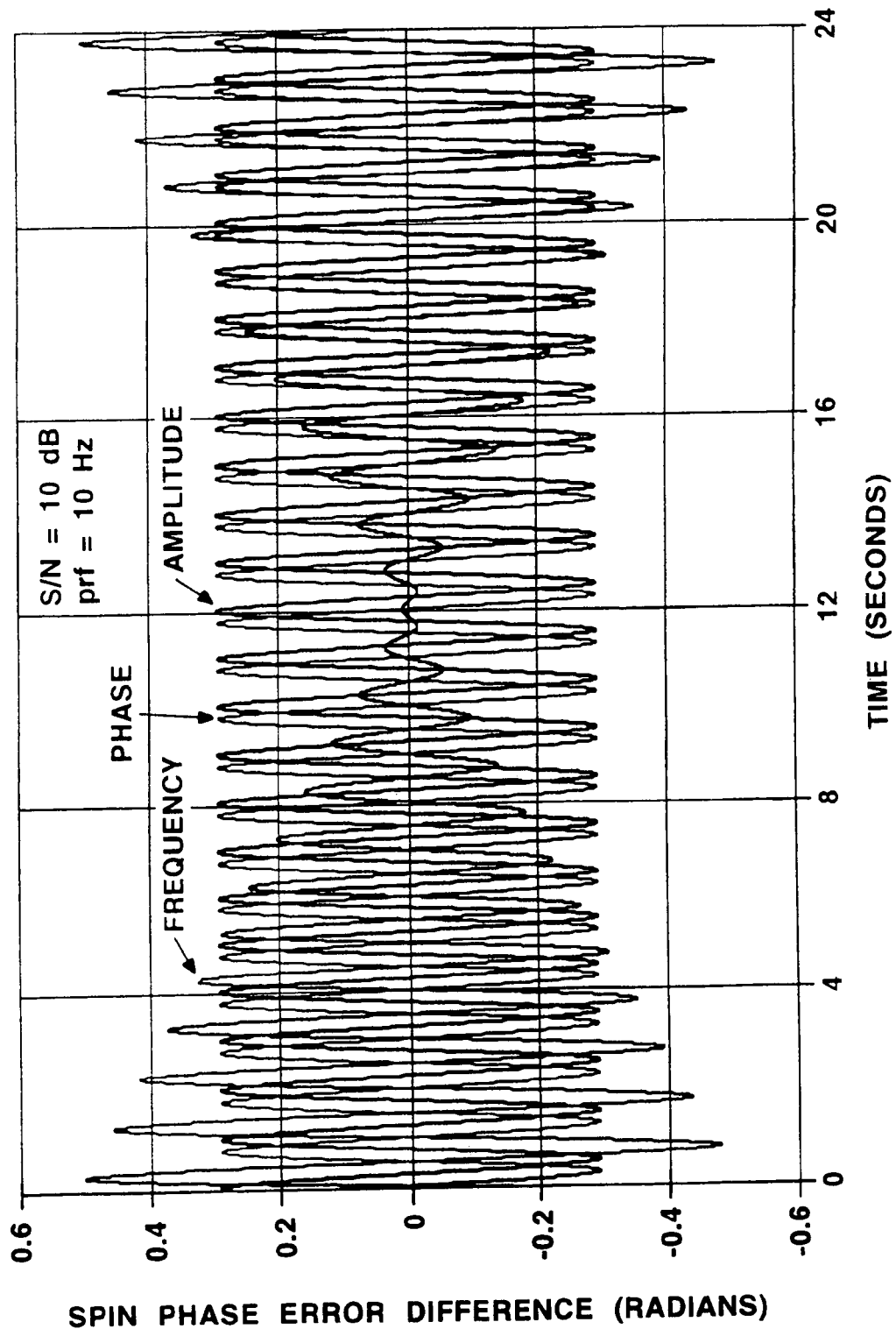
FIG. 13 is a plot of spin phase error difference.

FIG. 13 shows a plot of spin phase error difference as a function of time. At 3 Hz and 15 dB S/N, the spin phase difference would be approximately 1.7 times the results shown in FIG. 11. For this reason, the plot of FIG. 14 shows the results of operating at 10 Hz with 10 dB SNR.

Figure 14:
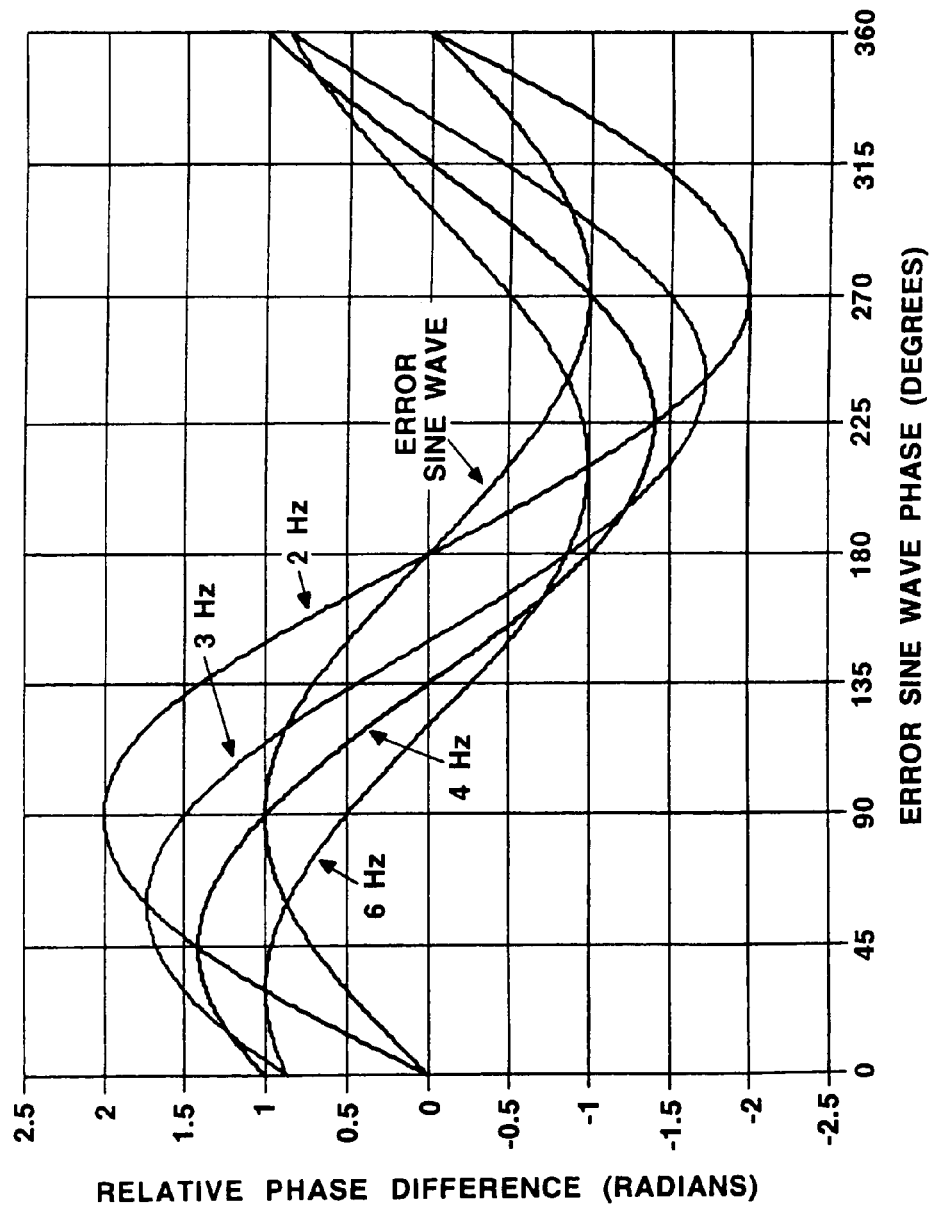
FIG. 14 is a plot of phase difference of 1 Hz Sine wave for several data rates.

Referring to FIG. 14, consider an error sine wave of amplitude 1 radian (as shown). If this sine wave is sampled at the Nyquist rate (2 Hz), the phase difference peaks at ±2 radians. For higher sampling rates the phase difference reduces, as shown in the figure. For example, at 3 Hz, a 1.7× increase over the 4 Hz example is observed. Note that at 6 Hz the phase difference is ±1 radians. These results suggest that a tradeoff between SNR and data rate will result in a different balance, where higher data rate with low SNR is favored by a phase difference loop or a phase difference Doppler, compared to a batch process where data rate much higher than Nyquist is not needed.

Figure 15:
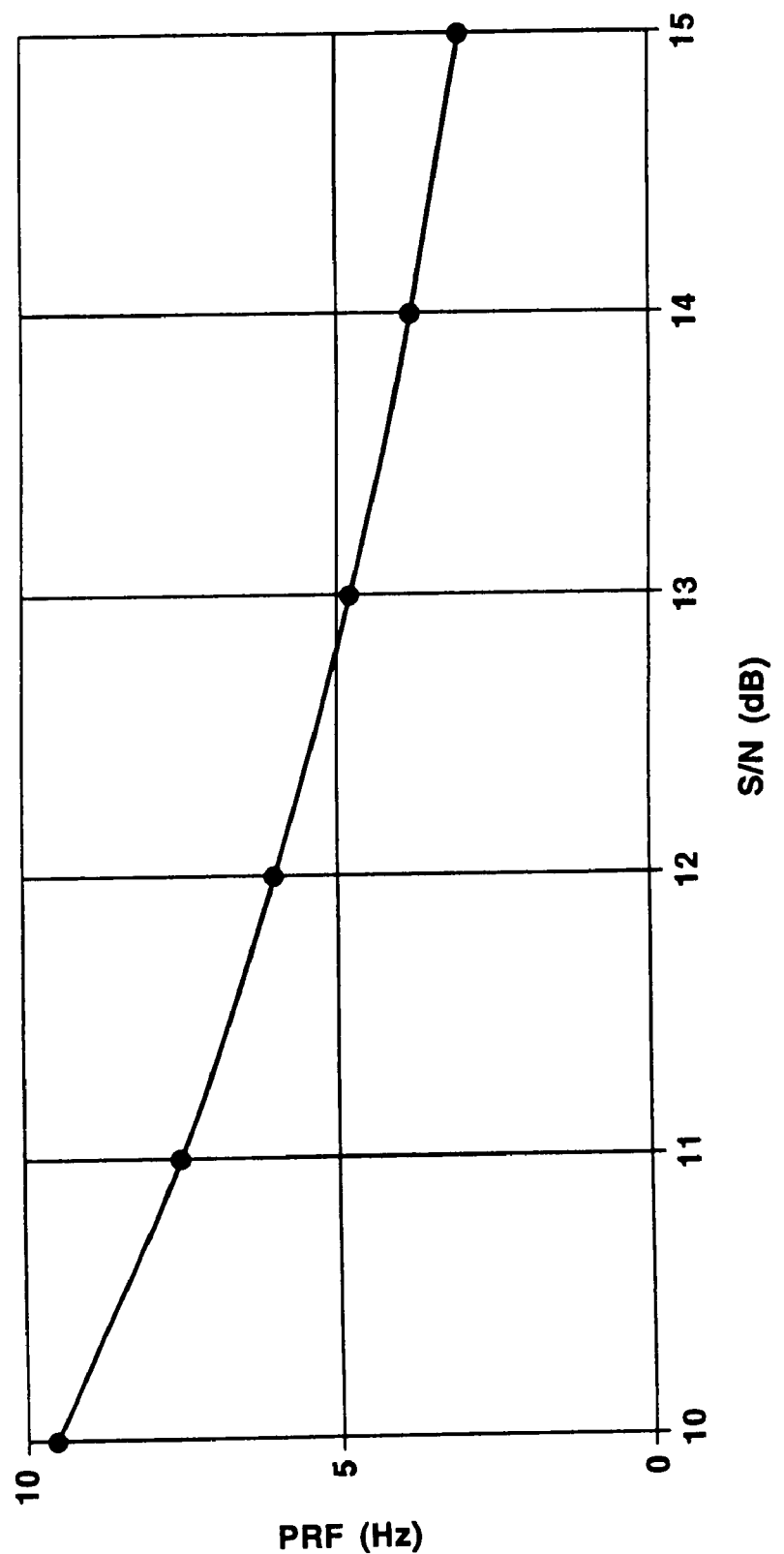
FIG. 15 is a plot illustrating the tradeoff between SNR and data rate for constant power.

FIG. 15 shows a plot of data rate (PRF) versus SNR, and illustrates the tradeoff between these two resources for constant power. The curve is a plot of SNR×data rate=a constant. For example, 15 dB SNR at a PRF of 3 Hz would require the same energy as a 12 dB SNR at a PRF of 6 Hz. For a batch process with a 3 Hz PRF, a 15 dB SNR is preferable for higher $P_d$ in the spectral detection process.

At or above 3 Hz and SNR of 15 dB, batch processing produces range estimates of component motion and avoids the need for a phase tracking loop, since RMS error is less than 1 radian. For a spin or precession component amplitude of 0.0075 m or less, no WBER spectrum detection is required. If the combined PDR and track filtering requires a phase tracking loop, options include processing at 3 Hz PRF and a SNR of 15 dB, with increase of data dwell, or increased chirp bandwidth, or both, or 6 Hz PRF and SNR of 12 dB for reduced error in estimating phase difference pulse-to-pulse.

Although described in the context of a tracking radar system, it will be appreciated that the technique of the present invention could be used in other applications that require high-precision Doppler measurements (for example, weather radars).

Other embodiments are within the scope of the following claims.

What is claimed is:

1. A method of determining range of a radar target comprising:
    receiving signal samples based on returns of a target during tracking;
    processing the signal samples to produce a wideband envelope range estimate for components of target motion comprising precession and spin motion components;
    measuring the signal samples to produce ambiguous phase values;
    providing an integer number of cycles in phase change estimate;
    adding said estimate with two pi with a result added to said ambiguous phase values to provide a phase value;
    differencing said phase value with the wideband envelope range estimate to provide an error signal; and
    differencing the wideband envelope range estimate with the error signal to produce an unambiguous phase value indicative of range.

2. The method of claim 1, further comprising:
    determining an estimate of ballistic trajectory for the signal samples; and
    removing the estimated ballistic trajectory during processing.

3. The method of claim 1 wherein processing operates at a sampling rate that is at least twice the frequency of the spin motion components.

4. The method of claim 1 further comprising:
    determining a magnitude of the error value and
    adjusting resources of a radar system that performs the tracking to ensure that the magnitude of the error is less than a one sigma error.

5. The method of claim 4 wherein the radar system resources comprise signal-to-noise ratio.

6. The method of claim 5 wherein the radar system resources further comprise data rate.

7. A method of determining range of a radar target comprising:
    receiving signal samples based on returns of a target during tracking;
    processing the signal samples to produce a wideband envelope range estimate for components of target motion comprising precession and spin motion components;
    measuring the signal samples to produce ambiguous phase values;
    using each wideband envelope range estimate and ambiguous phase value to produce an unambiguous phase value indicative of range wherein using comprises:
        subtracting the measured ambiguous phase from the wideband envelope range estimate to produce an error value associated with the wideband envelope range estimate; and
        subtracting the error value from the wideband envelope range estimate to give the unambiguous phase value;
    determining an estimate of ballistic trajectory for the signal samples;
    removing the estimated ballistic trajectory during processing; and
    wherein processing comprises:
    producing a spectrum of wideband envelope range estimates from the signal samples;
    transforming the wideband envelope range estimates to obtain a spectral estimate of each motion component of precession, spin, spin plus precession and spin minus precession;
    detecting each motion component;
    estimating amplitude, frequency and phase for each motion component spectral estimate; and
    forming a sinusoid in range motion from the estimate of amplitude, frequency and phase for each motion component spectral estimate.

8. The method of claim 7 wherein processing occurs in batch mode for signal samples obtained during several cycles of precession motion.

9. The method of claim 7 wherein the signal samples comprise pulses and using further comprises:
    using the sinusoid in range motion to determine an integer number k of cycles in phase change between the pulses.

10. The method of claim 7 wherein using further comprising adding $2\pi k$ to the measured ambiguous phase value prior to subtracting the measured ambiguous phase value from the wideband envelope range estimate.

11. An apparatus for determining range of a radar target comprising:
    means for processing the signal samples based on returns of a target during tracking to produce a wideband envelope range estimate for components of target motion comprising precession and spin motion components;
    means for measuring the signal samples to produce ambiguous phase values;
    means for providing an integer number of cycles in phase change estimate;
    means for adding said estimate with two pi with a result added to said ambiguous phase values to provide a phase value;
    means for differencing said phase value with the wideband envelope range estimate to provide an error signal; and
    means for differencing the wideband envelope range estimate with the error signal to produce an unambiguous phase value indicative of range.

12. A system, comprising:
    a transmitter/receiver to direct transmit signals to and receive return signals from a target;
    a processor to process the return signals as in-phase and quadrature samples to produce angle information and range signals;
    a tracker to track a target detected according to results of the processing by the first processor, the tracker measuring range data during tracking and estimating a ballistic trajectory therefrom; and
    a unit operable to provide a wideband envelope range estimate of the in-phase and quadrature samples and an ambiguous phase measurement of the in-phase and quadrature samples, to provide an integer number of cycles in phase change estimate to add with two pi with a result added to said ambiguous phase values to provide a phase value, to difference said phase value with the wideband envelope range estimate to provide an error signal, and to difference the wideband envelope range estimate with the error signal to produce a range measurement that is unambiguous in phase.

* * * * *

UNITED STATES PATENT AND TRADEMARK OFFICE
CERTIFICATE OF CORRECTION

| | |
|---|---|
| PATENT NO. | : 7,046,190 B1 |
| APPLICATION NO. | : 10/627436 |
| DATED | : May 16, 2006 |
| INVENTOR(S) | : Fritz Steudel |

Page 1 of 1

It is certified that error appears in the above-identified patent and that said Letters Patent is hereby corrected as shown below:

Column 2, line 67 delete "error difference." and replace with --error differences.--.

Column 3, line 1, delete "phase difference" and replace with --phase differences-- .

Column 5, line 30-31, delete "estimator 80 batch-processes" and replace with --estimator 80 batch processes--.

Column 8, line 3, delete "on number" and replace with --on the number--.

Column 9, line 39, delete "error value and" and replace with --error value; and--.

Signed and Sealed this

Fifth Day of December, 2006

JON W. DUDAS
*Director of the United States Patent and Trademark Office*